US011942074B2

(12) United States Patent
Fukutomi et al.

(10) Patent No.: US 11,942,074 B2
(45) Date of Patent: Mar. 26, 2024

(54) LEARNING DATA ACQUISITION APPARATUS, MODEL LEARNING APPARATUS, METHODS AND PROGRAMS FOR THE SAME

(71) Applicant: NIPPON TELEGRAPH AND TELEPHONE CORPORATION, Tokyo (JP)

(72) Inventors: Takaaki Fukutomi, Tokyo (JP); Takashi Nakamura, Tokyo (JP); Kiyoaki Matsui, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 339 days.

(21) Appl. No.: 17/429,737

(22) PCT Filed: Jan. 29, 2020

(86) PCT No.: PCT/JP2020/003062
§ 371 (c)(1),
(2) Date: Aug. 10, 2021

(87) PCT Pub. No.: WO2020/166322
PCT Pub. Date: Aug. 20, 2020

(65) Prior Publication Data
US 2022/0101828 A1    Mar. 31, 2022

(30) Foreign Application Priority Data

Feb. 12, 2019   (JP) ................................ 2019-022516

(51) Int. Cl.
*G10L 15/06*    (2013.01)
*G06N 20/00*    (2019.01)
(Continued)

(52) U.S. Cl.
CPC ............ *G10L 15/063* (2013.01); *G06N 20/00* (2019.01); *G10L 21/0208* (2013.01);
(Continued)

(58) Field of Classification Search
CPC ....... G10L 15/063; G10L 25/78; G10L 25/84; G10L 25/87; G10L 25/81; G10L 2025/783; G10L 2025/786; G10L 21/0208
See application file for complete search history.

(56) References Cited

U.S. PATENT DOCUMENTS

2015/0194163 A1*  7/2015  Hiwasaki ............. G10L 19/125
                                                          704/219
2016/0171974 A1*  6/2016  Hannun ................. G06N 3/084
                                                          704/232

(Continued)

OTHER PUBLICATIONS

Masakiyo Fujimoto (2010) "The Fundamentals and Recent Progress of Voice Activity Detection" IEICE Technical Report, vol. 110, No. 81, pp. 7-12.

*Primary Examiner* — Samuel G Neway

(57) ABSTRACT

A learning data acquisition device or the like, capable of acquiring learning data by superimposing noise data on clean voice data at an appropriate SN ratio, is provided. The learning data acquisition device includes a voice recognition influence degree calculation unit and a learning data acquisition unit. The voice recognition influence degree calculation unit calculates an influence degree on voice recognition accuracy caused by a change of a signal-to-noise ratio, based on a result of voice recognition on the $k^{th}$ noise superimposed voice data and a result of voice recognition on the $k-1^{th}$ noise superimposed voice data, where K is an integer of 2 or larger, k=2, 3, . . . , K, and a signal-to-noise ratio of the the $k^{th}$ noise superimposed voice data is smaller than a signal-to-noise ratio of the $k-1^{th}$ noise superimposed voice data, and obtains a largest signal-to-noise ratio $SNR_{apply}$
(Continued)

among signal-to-noise ratios of the k–1$^{th}$ noise superimposed voice data when the influence degree meets a given threshold condition. The learning data acquisition unit acquires noise superimposed voice data having a signal-to-noise ratio that is equal to or larger than the signal-to-noise ratio SNR$_{apply}$, as learning data.

16 Claims, 2 Drawing Sheets

(51) Int. Cl.
*G10L 21/0208* (2013.01)
*G10L 25/78* (2013.01)
*G10L 25/81* (2013.01)
*G10L 25/84* (2013.01)
*G10L 25/87* (2013.01)

(52) U.S. Cl.
CPC .............. *G10L 25/78* (2013.01); *G10L 25/81* (2013.01); *G10L 25/84* (2013.01); *G10L 25/87* (2013.01); *G10L 2025/783* (2013.01); *G10L 2025/786* (2013.01)

(56) References Cited

U.S. PATENT DOCUMENTS

| | | | | |
|---|---|---|---|---|
| 2017/0148433 | A1* | 5/2017 | Catanzaro | G10L 25/18 |
| 2019/0392859 | A1* | 12/2019 | Li | G10L 25/84 |
| 2020/0074997 | A1* | 3/2020 | Jankowski, Jr. | G06N 3/045 |
| 2022/0101828 | A1* | 3/2022 | Fukutomi | G10L 15/063 |

* cited by examiner

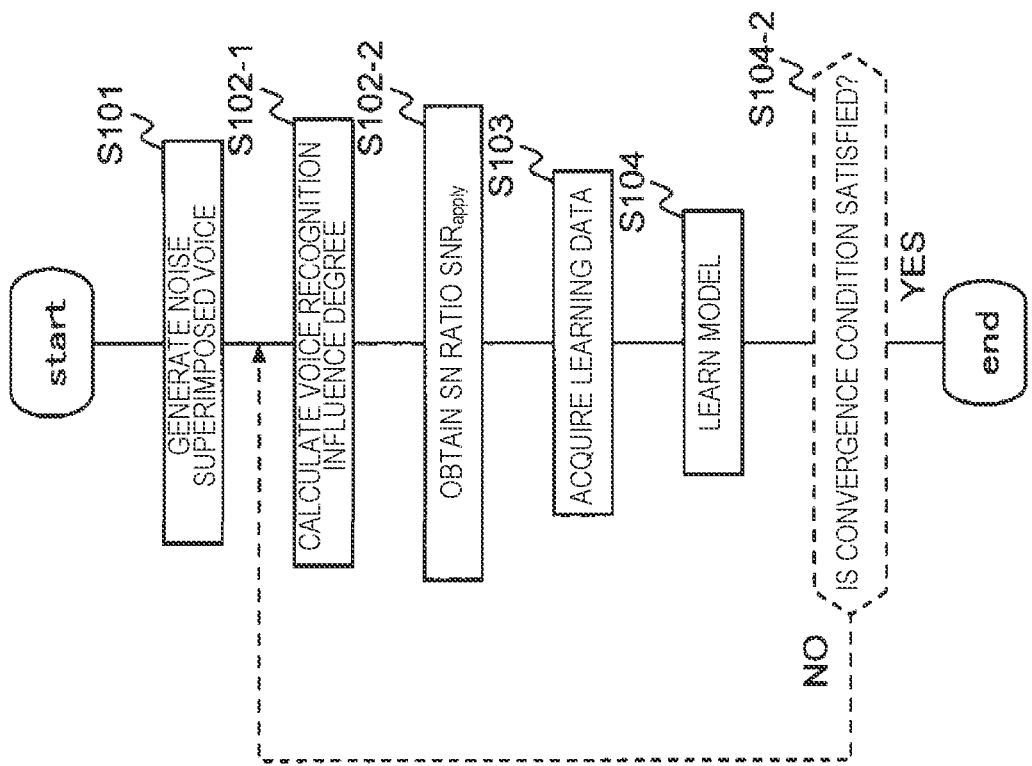

LEARNING DATA ACQUISITION APPARATUS, MODEL LEARNING APPARATUS, METHODS AND PROGRAMS FOR THE SAME

CROSS-REFERENCE TO RELATED APPLICATIONS

This application is a U.S. 371 Application of International Patent Application No. PCT/JP2020/003062, filed on 29 Jan. 2020, which application claims priority to and the benefit of JP Application No. 2019-022516, filed on 12 Feb. 2019, the disclosures of which are hereby incorporated herein by reference in their entireties.

TECHNICAL FIELD

The present invention relates to a learning data acquisition device that acquires learning data to be used for learning a model for detecting voice or non-voice, a model learning device that learns a model with use of the learning data, methods thereof, and a program.

BACKGROUND ART

As an utterance section detection technique for detecting only an utterance section (voice section) from an input signal and excluding non-utterance section (non-voice section), Non-Patent Literature 1 has been known. Here, a non-voice section is a section not required by an application using the utterance section detection technique. An utterance section in which another speaker utters around the speaker to be detected is also handled as a non-voice section.

The utterance section detection technique has a role to exclude unnecessary signals (non-voice) as pre-processing of voice recognition, to thereby prevent degradation of the recognition accuracy.

As an utterance section detection technique, there is a method of detecting an utterance section (voice) and a non-utterance section (non-voice) with use of a static voice/non-voice model in which acoustic characteristics of voice and non-voice are constructed as learning data in advance (see Non-Patent Literature 1).

In the utterance section detection technique based on the voice/non-voice model, with respect to each frame of an input signal, voice likelihood and non-voice likelihood are calculated, and the likelihood ratio or the like is compared with a predetermined threshold, whereby a voice section and a non-voice section are determined.

In order to detect an utterance section robustly in various noisy environments, it is necessary that the voice/non-voice model learns voice data in various noisy environments.

CITATION LIST

Non-Patent Literature

Non-Patent Literature 1: Fujimoto Masakiyo, "Advances in voice activity detection", IEICE Technical Report., SP-2010-23(2010-06)

SUMMARY OF THE INVENTION

Technical Problem

However, since it is difficult to prepare a large amount of voice data in noisy environments required for model construction, noise is artificially superimposed on voice not mixed with noise (hereinafter also referred to as clean voice), which is used as learning data.

For noise superimposition, a superimposition condition (SN ratio) is manually adjusted according to an expected use scene. Since voice in the noisy environment is artificially generated, voice that cannot be expected in a real use scene may be generated. In that case, since erroneous characteristics are learned based on the voice that cannot be expected in a real use scene, the learned model may cause erroneous detection or erroneous rejection. For example, voice of small whispering under a noisy environment may be learned, causing a problem that erroneous detection is likely to be made. Moreover, if learning data under only a good SN ratio condition (not noisy condition) is generated, it may not become useful learning data for a voice/non-voice model, so that the accuracy may not be improved. Therefore, as learning data, it is necessary to prepare data in a range where good operation is not realized with the current model (data to be strengthened). This means that for learning a voice/non-voice model of high accuracy, it is necessary to generate learning data by superimposing noise on clean voice so as to realize an appropriate SN ratio that is not too small and not too large.

An object of the present invention is to provide a learning data acquisition device capable of acquiring learning data by superimposing noise data on clean voice data at an appropriate SN ratio, a model learning device that learns a model using the learning data, methods thereof, and a program.

Means for Solving the Problem

In order to solve the problem described above, according to an aspect of the present invention, a learning data acquisition device includes a voice recognition influence degree calculation unit and a learning data acquisition unit. The voice recognition influence degree calculation unit calculates an influence degree on voice recognition accuracy caused by a change of a signal-to-noise ratio, based on a result of voice recognition on the $k^{th}$ noise superimposed voice data and a result of voice recognition on the $k-1^{th}$ noise superimposed voice data, where K is an integer of 2 or larger, k=2, 3, ..., K, and a signal-to-noise ratio of the $k^{th}$ noise superimposed voice data is smaller than a signal-to-noise ratio of the $k-1^{th}$ noise superimposed voice data, and obtains a largest signal-to-noise ratio $SNR_{apply}$ among signal-to-noise ratios of the $k-1^{th}$ noise superimposed voice data when the influence degree meets a given threshold condition. The learning data acquisition unit acquires noise superimposed voice data of a signal-to-noise ratio that is equal to or larger than the signal-to-noise ratio $SNR_{apply}$, as learning data.

Effects of the Invention

The present invention provides advantageous effects that learning data can be acquired by superimposing noise data on clean voice data at an appropriate SN ratio, and with use of the learning data, a model having high detection accuracy can be learned.

BRIEF DESCRIPTION OF DRAWINGS

FIG. 2 illustrates an example of a process flow by the model learning device according to the first embodiment.

DESCRIPTION OF EMBODIMENTS

Figure 1:
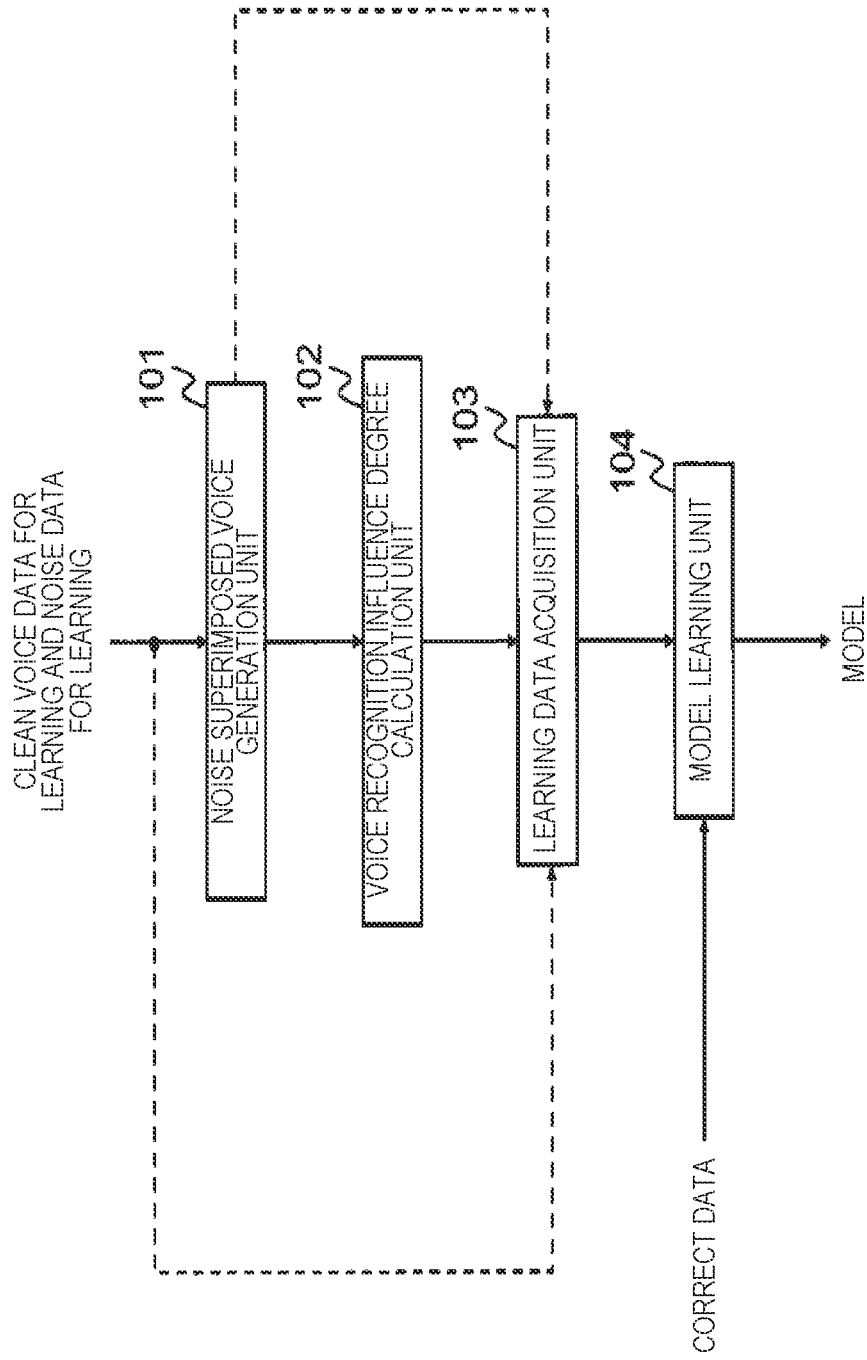
FIG. 1 is a function block diagram of a model learning device according to a first embodiment.

Hereinafter, embodiments of the present invention will be described. In the drawing used in the description provided below, components having the same function and steps performing the same processing are denoted by the same reference signs and omit the overlapping description. It is assumed that processing performed for each element unit such as a vector or a matrix is applied to all elements of the vector or the matrix unless otherwise mentioned.

Points of First Embodiment

In the present embodiment, data used as learning data is prepared under the consideration of how the data affects the voice recognition rate, including positive and negative influences. Therefore, learning data is constructed by calculating an appropriate noise superimposition level (SN ratio) from an error trend of voice recognition, and superimposing noise on the clean voice according to the level.

First Embodiment

FIG. 1 illustrates a function block diagram of a model learning device according to the first embodiment, and FIG. 2 illustrates the processing flow thereof.

A model learning device includes a noise superimposed voice generation unit 101, a voice recognition influence degree calculation unit 102, a learning data acquisition unit 103, and a model learning unit 104.

The model learning device receives clean voice data for learning and noise data for learning as inputs, acquires learning data from these types of data, learns a model for detecting voice or non-voice with use of the acquired learning data, and outputs a model that is a learning result.

The model learning device is a special device configured such that a special program is read in a publicly-known or dedicated computer having a central processing unit (CPU), a main memory (RAM: random access memory), and the like. The model learning device executes respective processes under control of the CPU, for example. Data input to the model learning device and data obtained in respective processes are stored in the main memory for example, and the data stored in the main memory is read to the central processing unit as required and is used for another process. Each of the processing units of the model learning device may be configured of hardware in which at least part thereof is an integrated circuit or the like. Each storage unit provided to the model learning device can be configured of a main memory such as a random access memory (RAM), or middleware such as a relational database or a key value store. However, each storage unit is not necessarily provided in the model learning device. It may be configured of an auxiliary storage unit such as a hard disk, an optical disk, or a semiconductor memory element such as a flash memory, and may be provided outside the model learning device.

Hereinafter, each unit will be described.

<Noise Superimposed Voice Generation Unit 101>

The noise superimposed voice generation unit 101 receives clean voice data for learning and noise data for learning as inputs, superimposes predetermined noise data on the clean voice data while changing the signal-to-noise ratio (hereinafter also referred to as an SN ratio) in K steps, generates K pieces of noise superimposed voice data (S101), and outputs them. Note that K is an integer of 2 or larger. For example, it may be set between −30 dB to +30 dB at intervals of 5 dB (in this case, K=13). There is a case where the noise data prepared here may include voice data therein, such as a crowd. Such voice data is handled as noise data (non-voice data). This is because a model as a learning result handles only the voice uttered by a speaker who is a detection target as an utterance section, and handles the voice uttered by a speaker other than the detection target and the background voice as a non-utterance section.

<Voice Recognition Influence Degree Calculation Unit 102>

The voice recognition influence degree calculation unit 102 receives K pieces of noise superimposed voice data of different SN ratios as inputs, and based on a result of voice recognition on the $k^{th}$ noise superimposed voice data and a result of voice recognition on the k−$1^{th}$ noise superimposed voice data, calculates an influence degree on the voice recognition accuracy caused by a change of the SN ratio (S102-1). It is provided that the SN ratio of the $k^{th}$ noise superimposed voice, where k=2, 3, . . . , K is smaller than the SN ratio of the k−$1^{th}$ noise superimposed voice data. For example, the voice recognition influence degree calculation unit 102 calculates the voice recognition accuracy on the K pieces of noise superimposed voice data of different SN ratios. The utterance section detection accuracy mainly affects a deletion error $E_D$ of voice recognition (error caused by missing of a voice section) and an insertion error $E_I$ (error caused by taking a voice section too much), and less affects a replacement error $E_S$ (error within a correct utterance section). Therefore, the influence degree, on the voice recognition accuracy in the utterance section detection caused by a change of the SN ratio is defined by the following expression using the deletion error $E_D$ and the insertion error $E_I$.

[Math. 1]

$$\frac{1}{M}\sum_{i=1}^{M} \Delta E_{i,snr=k} = \alpha\left(\frac{E_{D,snr=k} - E_{D,snr=k-1}}{N_i}\right) + (1-\alpha)\left(\frac{E_{I,snr=k} - E_{I,snr=k-1}}{N_i}\right) \quad (1)$$

Here, M represents the number of voice files, i=1, 2, . . . , M, and $N_i$ represents the number of characters (or the number of words) of the $i^{th}$ utterance (voice file). snr=k represents the $k^{th}$ SN ratio when the SN ratio is set in a decrementing manner from the upper limit of the SN ratio (for example, +30 dB) at intervals of a step width (5 dB or the like). $E_{D,snr=k}$ represents the number of deletion error characters (or words). $E_{I,snr=k}$ represents the number of insertion error characters (or words), and α represents a deletion error weight (0.0 to 1.0). It may be set to a small value such as 0.3 when noise data in which a deletion error is likely to be caused is superimposed. Generally, it may be set to 0.5. The above expression represents the influence degree on the recognition accuracy when the SN ratio is changed from the k−$1^{th}$ value to the $k^{th}$ value. Note that the number of deletion error characters $E_{D,snr=k}$ and the number of insertion error characters $E_{I,snr=k}$ can be acquired by obtaining a voice recognition result by giving noise superimposed voice data to an existing voice recognition model and comparing the voice recognition result with correct data (for example, correct text data corresponding to the voice data included in the noise superimposed voice data). The correct data may be given manually. Alternatively, a result of voice recognition performed by using an existing voice recognition model on clean voice data corresponding to the noise superimposed voice data may be used as correct data.

Note that how to obtain the influence degree on the voice recognition accuracy caused by a change of the SN ratio is not limited to Expression (1) but may be obtained by another method.

The voice recognition influence degree calculation unit 102 obtains a largest SN ratio $SNR_{apply}$ among the SN ratios of the $k-1^{th}$ noise superimposed voice data when the influence degree meets a given threshold condition (S102-2), and outputs it to the learning data acquisition unit 103. For example, in the case of using the influence degree calculated by Expression (1), since it shows that the influence is larger as the influence degree calculated by Expression (1) is larger, the following expression or the like can be used as a threshold condition.

[Math. 2]

$$\frac{1}{M}\sum_{i=1}^{M} \Delta E_{i,snr=k} > \theta$$

In this case, the voice recognition influence degree calculation unit 102 obtains the SN ratio $SNR_{apply}$ of the $k-1^{th}$ noise superimposed voice data when the influence degree of the $k^{th}$ noise superimposed voice data exceeds a predetermined threshold θ.

This is because the voice recognition influence degree calculation unit 102 determines that the utterance section detection accuracy significantly deteriorates when the influence degree exceeds the threshold θ, and in the learning data acquisition unit 103 described below, the SN ratio of the $k-1^{th}$ SN ratio or larger is used as an SN ratio for noise superimposition on the clean voice data. Erroneous detection in the utterance section detection behaves very peaky (suddenly a section significantly different from the previously detected section is detected). Therefore, an influence by the change of the SN ratio is used as a scale.

Note that among K-1 pieces of influence degrees corresponding to k=2, 3, . . . , K, if there are two or more influence degrees exceeding the threshold θ, the largest SN ratio among the SN ratios of the $k-1^{th}$ noise superimposed voice data corresponding to the influence degree exceeding the threshold θ is set as the SN ratio $SNR_{apply}$. This is because, an SN ratio smaller than the largest SN ratio is one after peaky behavior, and erroneous detection occurs frequently, so that it may not be suitable as learning data. Therefore, for example, the influence degree may be calculated from k=2 in an ascending order, and the processing may end when the influence degree exceeds the threshold θ, and the subsequent calculation of the influence degree or the like may be omitted.

Note that in the case where the influence is smaller as the value indicating the influence degree is larger (for example, in the case of using an inverse value of the influence degree obtained by Expression (1) or the like is used as a value indicating the influence degree), a value below the threshold or a value equal to or smaller than the threshold may be used for threshold conditions.

<Learning Data Acquisition Unit 103>

The learning data acquisition unit 103 receives the SN ratio $SNR_{apply}$ as an input, acquires noise superimposed voice data having an SN ratio that is equal to or larger than the $SNR_{apply}$ as learning data (S103), and outputs it.

In the present embodiment, the learning data acquisition unit 103 receives clean voice data for learning and noise data for learning as inputs, superimposes predetermined noise data on the clean voice data so as to have an SN ratio equal to or larger than the SN ratio $SNR_{apply}$, generates learning data, and acquires it.

Nota that as described above, in order to learn a voice/non-voice model of high accuracy, it is preferable to superimpose noise on clean voice at an appropriate SN ratio that is not too large. Therefore, it is preferable to superimpose predetermined noise data on clean voice data at an SN ratio between $SNR_{apply}$ and $(1+\gamma)SNR_{apply}$ to generate learning data. γ represents a predetermined value indicating a range previously calculated through simulation, experiments, or the like in order to acquire an appropriate SN ratio that is not too large, and it is a positive real number.

<Model Learning Unit 104>

The model learning unit 104 receives correct data and learning data as inputs, learns a model for detecting voice or non-voice with use of the correct data and the learning data (S104), and outputs the learned model. As a framework of model learning, any method may be used if it enables binary classification. For example, a method based on the deep learning technique (see Reference 1) such as LSTM capable of considering long-time sequential information may be used.

(Reference 1) Hinton et al., "Deep Neural Networks for Acoustic Modeling in Speech Recognition", IEEE SP magazine, November 2012

Note that as a framework of model learning, support vector machine (SVM) or the like is applicable, without being limited to DNN or LSTM.

Note that correct data is information indicating a voice section or a non-voice section of clean voice data for learning. For example, it may be a label given to the clean voice data for learning at every time of day, indicating that it is a voice section or a non-voice section, or information indicating the start time and end time of a voice section or a non-voice section or the length of the section. The correct data may be given manually. Alternatively, clean voice data for learning may be input to an existing voice/non-voice detection device or a voice recognition device, and a processing result of the voice/non-voice detection device or information indicating a voice section or a non-voice section generated in the process performed by the voice recognition device may be used.

<Effects>

From the configuration described above, it is possible to acquire learning data by superimposing noise data on clean voice data at an appropriate SN ratio, and to learn a model of high detection accuracy with use of the learning data.

<Modification>

From the model learning device of the first embodiment, it is possible to take out the noise superimposed voice generation unit 101, the voice recognition influence degree calculation unit 102, and the learning data acquisition unit 103, and allow them to function as a learning data acquisition device. Even in such a configuration, it is possible to acquire learning data by superimposing noise data on clean voice data at an appropriate SN ratio. Then, with use of the acquired learning data, a model may be learned by another device.

Further, from the model learning device of the first embodiment, the voice recognition influence degree calculation unit 102 and the learning data acquisition unit 103 may be taken out, and they may be allowed to function as a learning data acquisition device. The processing is the noise superimposed voice generation unit 101 may be performed by another device.

In the present embodiment, an example of setting the SN ratio at intervals of 5 dB when superimposing noise data on clean voice data has been described. However, In the case where it is possible to predict, at a certain extent, an SN ratio of peaky behavior (suddenly a section significantly different from the previously detected section is detected), the step width may be set to be smaller at the predicted SN ratio and before and after it.

Second Embodiment

Part different from the first embodiment will be mainly described.

The processing content of the learning data acquisition unit 103 differs from that of the first embodiment.

Learning Data Acquisition Unit 103>

The learning data acquisition unit 103 receives the SN ratio $SNR_{apply}$ as an input, acquires noise superimposed voice data of an SN ratio that is equal to or larger than the $SNR_{apply}$ as learning data (S103), and outputs it.

In the present embodiment, the learning data acquisition unit 103 selects noise superimposed voice data having an SN ratio, that is equal to or larger than the signal-to-noise ratio $SNR_{apply}$ from among K pieces of noise superimposed voice data generated by the noise superimposed voice generation unit 101, and acquires it as learning data.

Note that as described above, in order to learn a voice/non-voice model of high accuracy, it is preferable to superimpose noise on clean voice at an appropriate SN ratio that is not too large. Therefore, especially the $k-1^{th}$ to $k-1-\delta^{th}$ noise superimposed voice data may be selected and acquired as learning data. δ represents a predetermined value indicating a range previously calculated through simulation, experiments, or the like for obtaining an appropriate SN ratio that is not too large, and it is a positive integer.

<Effects>

With such a configuration, an effect that is the same as that of the first embodiment can be achieved. Moreover, the cost for performing noise superimposition on clean voice can be reduced.

Third Embodiment

Part different from the second embodiment will be mainly described.

In the model learning unit 104, as a result of model learning, if a predefined convergence condition is not satisfied, the voice recognition influence degree calculation S102-1 to the model learning S104 may be repeated as indicated by a broken line in FIG. 2. Here, the case in which a convergence condition is not satisfied is a case in which in a state where detection accuracy is not realized with the learned model for example, the detection accuracy is not improved with respect to the voice of a low SN ratio condition and there is no detection accuracy deterioration in the voice of a high SN ratio condition. Note that if there is detection accuracy deterioration in the voice of a high SN ratio condition, a configuration of discarding the learned model and performing model learning again from the beginning, while adding the voice of a higher SN ratio condition to the learning data, is acceptable.

<Model Learning Unit 104>

The model learning unit 104 learns a model for detecting voice or non-voice with use of correct data and learning data (S104).

Moreover, the model learning unit 104 determines whether or not the result of the model learning satisfies the preset convergence condition described above (S104-2), and when determining that it does not satisfy the preset convergence condition, the model learning unit 104 outputs a control signal to the voice recognition influence degree calculation unit 102 and the learning data acquisition unit 103 to allow them to perform the processing S102-1 to S103 again. When determining that the convergence condition is satisfied, the model learning unit 104 ends the processing and outputs the model learned when the convergence condition is satisfied.

<Voice Recognition Influence Degree Calculation Unit 102>

When the voice recognition influence degree calculation unit 102 has never performed model learning, it performs the processing S102-1 and the processing S102-2 that are the same as those in the second embodiment.

After learning by the model learning unit 104 once, the voice recognition influence degree calculation unit 102 calculates the influence degree on the voice recognition accuracy caused by a change of the SN ratio, by using the model learned by the model learning unit 104 for the utterance section detection processing included in the voice recognition processing (S102-1).

At that time, (1) the voice recognition influence degree calculation unit 102 may start calculation of the influence degree on the voice recognition accuracy caused by a change of the SN ratio from the $k^{th}$ noise superimposed voice data that is subsequent to the data in which $SNR_{apply}$ is adopted last time (that is, the upper limit of the SN ratio is changed to the SN ratio of the $k^{th}$ noise superimposed voice data). Alternatively, (2) the voice recognition influence degree calculation unit 102 may perform calculation with the step width of a new SN ratio from the $k-1^{th}$ data (that is, the upper limit of the SN ratio is changed to the SN ratio of the $k-1^{th}$ noise superimposed voice data). In the case of (2), for example, the step width of the new SN ratio may be set to be smaller than the previous step width. This is because since peaky behavior is caused between the SN ratio of the $k-1^{th}$ noise superimposed voice data and the SN ratio of the $k^{th}$ noise superimposed voice data (since there is an accuracy valley), it is considered that an appropriate influence degree may be easily calculated by setting the SN ratio intervals more minutely from the SN ratio of the $k-1^{th}$ noise superimposed voice data. In the case of such setting, a control signal is output to the noise superimposed voice generation unit 101 to allow it to perform the processing S101 again by changing the upper limit of the SN ratio to the SN ratio of the $k-1^{th}$ noise superimposed voice data and further changing the step width of the SN ratio. The noise superimposed voice generation unit 101 superimposes predetermined noise data on the clean voice data by changing the SN ratio in L steps with a step width of the new SN ratio from the $k-1^{th}$ data to thereby generate L pieces of noise superimposed voice data. Note that L is an integer of 2 or larger. The voice recognition influence degree calculation unit 102 receives L pieces of noise superimposed voice data as inputs instead of K pieces of noise superimposed voice data, and performs the same processing.

<Effects>

With this configuration, the cost for model learning can be reduced. Note that the present embodiment may be combined with the first embodiment.

Modification

It is assumed that the voice recognition influence degree calculation unit 102 obtains a plurality of SN ratios of the k−1$^{th}$ noise superimposed voice data meeting a threshold condition to which an influence degree is given. Assuming that the number of SN ratios of the k−1$^{th}$ noise superimposed voice data meeting the threshold condition is j=1, 2, ..., J, and the SN ratios are output to and stored in the learning data acquisition unit 103 as $SNR_{apply[1]}$, $SNR_{apply[2]}$, ..., $SNR_{apply[J]}$ in the descending order from the largest SN ratio, and as a result of learning by the SNR model learning unit 104 with use of the learning data of the noise superimposed voice data having the SN ratio that is equal to or larger than the SN ratio $SNR_{apply[j]}$ in sequence from j=1, if the convergence condition is not satisfied, the learning data acquisition unit 103 acquires learning data of noise superimposed voice data having the SN ratio that is equal to or larger than the next larger SN ratio $SNR_{apply[j+1]}$, and repeats model learning.

With this configuration, the cost for the voice recognition influence degree calculation unit can be reduced.

Other Modifications

The present invention is not limited to the embodiments and the modifications described above. For example, the respective types of processing described above may be performed not only in a time-series manner as described above but may be performed in parallel or individually according to the processing capacity of the device that performs the processing or as required. In addition, changes can be made as appropriate within a scope not deviating from the effect of the present invention.

<Program and Recording Medium>.

Moreover, the various processing functions in the respective devices described in the embodiments and the modifications described above may be realized by a computer. In that case, the processing contents of the functions that should be held by the respective devices are described by the program. Then, through execution of the program on the computer, the various processing functions in the respective devices are implemented on the computer.

The program describing the processing contents can be recorded on a computer-readable recording medium. A computer-readable recording medium may be, for example, a magnetic recording device, an optical disk, a magneto-optical recording medium, a semiconductor memory, or the like.

Moreover, distribution of the program is performed by selling, assigning, lending, or the like a portable recording medium such as a DVD or a CD-ROM on which the program is recorded. Furthermore, the program may be distributed by being stored on a storage device of a server computer and transferring the program from the server computer to another computer over a network.

A computer that executes such a program first stores the program recorded on a portable recording medium or the program transferred from the server computer, in the storage unit of the own, for example. Then, at the time of executing the processing, the computer reads the program stored in the storage unit of the own, and executes processing according to the readout program. As another embodiment of the program, the computer may directly read the program from a portable recording medium and execute processing according to the program. Moreover, each time a program is transferred to the computer from the server computer, the computer may execute processing each time according to the received program. Furthermore, it is also possible to have a configuration of executing the processing described above by a service in which transfer of a program to the computer from the server computer is not performed and a processing function is implemented only by the execution instruction and acquisition of the result, that is, a so-called application service provider (ASP) type service. Note that the program includes information to be provided for processing by a computer and is equivalent to the program (data that is not a direct instruction to the computer but has a nature of defining processing by the computer, or the like).

Further, while it is described that each device is configured by execution of a predetermined program on the computer, at least part of the processing content may be implemented by hardware.

The invention claimed is:

1. A learning data acquisition device comprising a processor configured to execute operations comprising:

determining an influence degree on voice recognition accuracy caused by a change of a signal-to-noise ratio, based on a result of voice recognition on k$^{th}$ noise superimposed voice data and a result of voice recognition on k−1$^{th}$ noise superimposed voice data, wherein K is an integer of 2 or larger, k=2, 3, ..., K, and a signal-to-noise ratio of the k$^{th}$ noise superimposed voice data is smaller than a signal-to-noise ratio of the k−1$^{th}$ noise superimposed voice data;

obtaining a largest signal-to-noise ratio $SNR_{apply}$ among signal-to-noise ratios of the k−1$^{th}$ noise superimposed voice data when the influence degree meets a given threshold condition; and acquiring noise superimposed voice data having a signal-to-noise ratio that is equal to or larger than the signal-to-noise ratio $SNR_{apply}$, as learning data.

2. The learning data acquisition device according to claim 1, wherein the acquiring further comprises superimposing predetermined noise data on clean voice data to have a signal-to-noise ratio that is equal to or larger than the signal-to-noise ratio $SNR_{apply}$ for generating and acquiring the learning data.

3. The learning data acquisition device according to claim 1, the processor further configured to execute operations comprising:

superimposing predetermined noise data on clean voice data by changing a signal-to-noise ratio of the predetermined noise data in K steps; and generating K pieces of the noise superimposed voice data, wherein the acquiring further comprises selecting and acquiring, from the K pieces of the noise superimposed voice data, and the noise superimposed voice data having a signal-to-noise ratio that is equal to or larger than the signal-to-noise ratio $SNR_{apply}$ as learning data.

4. The learning data acquisition device according to claim 1, wherein the learning data distinguishes utterance.

5. A model learning device comprising a processor configured to execute operations comprising:

determining an influence degree on voice recognition accuracy caused by a change of a signal-to-noise ratio, based on a result of voice recognition on k$^{th}$ noise superimposed voice data and a result of voice recognition on k−1$^{th}$ noise superimposed voice data, wherein K is an integer of 2 or larger, k=2, 3, ..., K, and a signal-to-noise ratio of the k$^{th}$ noise superimposed voice data is smaller than a signal-to-noise ratio of the k−1$^{th}$ noise superimposed voice data;

obtaining a largest signal-to-noise ratio $SNR_{apply}$ among signal-to-noise ratios of the $k-1^{th}$ noise superimposed voice data when the influence degree meets a given threshold condition;

acquiring noise superimposed voice data having a signal-to-noise ratio that is equal to or larger than the signal-to-noise ratio $SNR_{apply}$, as learning data; and learning a model for detecting voice or non-voice with use of the learning data.

6. The model learning device according to claim 5, wherein, when a learned model does not satisfy a preset convergence condition, repeating processing comprising the determining the influence degree, the acquiring the learning data, and the learning the model, and wherein the determining the influence degree further comprises using the model learned by the model learner when performing voice recognition.

7. The model learning device according to claim 6, wherein the acquiring further comprises superimposing predetermined noise data on clean voice data to have a signal-to-noise ratio that is equal to or larger than the signal-to-noise ratio $SNR_{apply}$ for generating and acquiring the learning data.

8. The model learning device according to claim 6, the processor further configured to execute operations comprising:

superimposing predetermined noise data on clean voice data by changing a signal-to-noise ratio of the predetermined noise data in K steps; and generating K pieces of the noise superimposed voice data, wherein the acquiring further comprises selecting and acquiring, from the K pieces of the noise superimposed voice data, noise superimposed voice data having a signal-to-noise ratio that is equal to or larger than the signal-to-noise ratio $SNR_{apply}$ as learning data.

9. The model learning device according to claim 5, wherein the acquiring further comprises superimposing predetermined noise data on clean voice data to have a signal-to-noise ratio that is equal to or larger than the signal-to-noise ratio $SNR_{apply}$ for generating and acquiring the learning data.

10. The model learning device according to claim 5, the processor further configured to execute operations comprising:

superimposing predetermined noise data on clean voice data by changing a signal-to-noise ratio of the predetermined noise data in K steps; and generating K pieces of the noise superimposed voice data, wherein the acquiring further comprising selecting and acquiring, from the K pieces of the noise superimposed voice data, noise superimposed voice data having a signal-to-noise ratio that is equal to or larger than the signal-to-noise ratio $SNR_{apply}$ as learning data.

11. A method comprising:

determining an influence degree on voice recognition accuracy caused by a change of a signal-to-noise ratio, based on a result of voice recognition on $k^{th}$ noise superimposed voice data and a result of voice recognition on $k-1^{th}$ noise superimposed voice data, wherein K is an integer of 2 or larger, k=2, 3, . . . , K, and a signal-to-noise ratio of the $k^{th}$ noise superimposed voice data is smaller than a signal-to-noise ratio of the $k-1^{th}$ noise superimposed voice data:

obtaining a largest signal-to-noise ratio $SNR_{apply}$ among signal-to-noise ratios of the k-1" noise superimposed voice data when the influence degree meets a given threshold condition; and acquiring noise superimposed voice data having a signal-to-noise ratio that is equal to or larger than the signal-to-noise ratio $SNR_{apply}$, as learning data.

12. The method according to claim 11, the method further comprising:

learning a model for detecting voice or non-voice with use of the learning data.

13. The method according to claim 12, wherein the acquiring further comprises superimposing predetermined noise data on clean voice data to have a signal-to-noise ratio that is equal to or larger than the signal-to-noise ratio $SNR_{apply}$ for generating and acquiring the learning data.

14. The method according to claim 12, further comprising:

superimposing predetermined noise data on clean voice data by changing a signal-to-noise ratio of the predetermined noise data in K steps; and generating K pieces of the noise superimposed voice data, wherein the acquiring further comprises selecting and acquiring, from the K pieces of the noise superimposed voice data, noise superimposed voice data having a signal-to-noise ratio that is equal to or larger than the signal-to-noise ratio $SNR_{apply}$ as learning data.

15. The method according to claim 11, wherein the acquiring further comprises superimposing predetermined noise data on clean voice data to have a signal-to-noise ratio that is equal to or larger than the signal-to-noise ratio $SNR_{apply}$ for generating and acquiring the learning data.

16. The method according to claim 11, further comprising:

superimposing predetermined noise data on clean voice data by changing a signal-to-noise ratio of the predetermined noise data in K steps; and generating K pieces of the noise superimposed voice data, wherein the acquiring further comprises selecting and acquiring, from the K pieces of the noise superimposed voice data, noise superimposed voice data having a signal-to-noise ratio that is equal to or larger than the signal-to-noise ratio $SNR_{apply}$ as learning data.

* * * * *